US011069929B1

(12) United States Patent
Battle et al.

(10) Patent No.: US 11,069,929 B1
(45) Date of Patent: Jul. 20, 2021

(54) APPARATUSES AND METHODS FOR OPTICALLY MONITORING FLUID LEVEL IN A CONTAINER, SUCH AS A BATTERY, USING A NON-CONTACT OPTICAL DETECTOR ON AN OUTSIDE SURFACE OF THE CONTAINER

(71) Applicant: NDSL, Inc., Raleigh, NC (US)

(72) Inventors: David Battle, Durham, NC (US); Frederick LaBach, Raleigh, NC (US); Mark Allen Wille, Angier, NC (US)

(73) Assignee: NDSL, Inc., Raleigh, NC (US)

( * ) Notice: Subject to any disclaimer, the term of this patent is extended or adjusted under 35 U.S.C. 154(b) by 678 days.

(21) Appl. No.: 15/602,672

(22) Filed: May 23, 2017

Related U.S. Application Data

(60) Provisional application No. 62/340,739, filed on May 24, 2016.

(51) Int. Cl.
  *G01J 1/42* (2006.01)
  *H01M 10/48* (2006.01)
  *G01F 23/292* (2006.01)
  *H01M 10/42* (2006.01)

(52) U.S. Cl.
  CPC ........ *H01M 10/484* (2013.01); *G01F 23/292* (2013.01); *H01M 10/425* (2013.01); *H01M 2010/4278* (2013.01); *H01M 2220/10* (2013.01)

(58) Field of Classification Search
  CPC ................ H01M 10/484; G01F 23/292; G01F 23/2921; G01F 23/2922; A61M 1/3624
  USPC ......................................... 250/574, 575, 577
  See application file for complete search history.

(56) References Cited

U.S. PATENT DOCUMENTS

| | | | | |
|---|---|---|---|---|
| 3,005,345 A | * | 10/1961 | Kaufman | G01F 23/292 73/327 |
| 4,015,645 A | | 4/1977 | Chamberlin | |
| 4,866,428 A | * | 9/1989 | Hinkle | G01F 23/2921 340/636.1 |
| 5,743,135 A | * | 4/1998 | Sayka | G01F 23/2922 250/577 |
| 5,747,824 A | * | 5/1998 | Jung | A61M 1/3624 250/577 |

(Continued)

FOREIGN PATENT DOCUMENTS

| | | |
|---|---|---|
| JP | 4658754 B2 | 3/2011 |
| WO | 2007049005 A1 | 5/2007 |

*Primary Examiner* — Georgia Y Epps
*Assistant Examiner* — Kevin Wyatt
(74) *Attorney, Agent, or Firm* — Withrow & Terranova, PLLC

(57) ABSTRACT

An apparatus for optically monitoring a fluid level of a container comprises a light emitter(s), a plurality of optical detectors, and a control system. The light emitter(s) is configured to emit light toward a target surface when positioned, at a fluid threshold level, on the outside of the container. Upper and lower optical detectors are configured to receive light reflected from the target surface when positioned on the outside of the container above and below the fluid threshold level. The control system detects, based on measured reflectance received by the upper and lower optical detector, whether the upper optical detector is above the fluid level and whether at least a portion of the lower optical detector is above the fluid level, and determines, based on these detections, whether the level of fluid within the container has dropped below the fluid threshold level.

34 Claims, 11 Drawing Sheets

(56) References Cited

U.S. PATENT DOCUMENTS

| | | | | |
|---|---|---|---|---|
| 6,115,128 | A * | 9/2000 | Vann | G01B 11/002 250/559.38 |
| 6,247,775 | B1 * | 6/2001 | Walker | B41J 2/17566 347/7 |
| 6,832,517 | B1 | 12/2004 | Kuo | |
| 7,109,513 | B2 | 9/2006 | Merz | |
| 7,537,735 | B2 | 5/2009 | Hiemer et al. | |
| 7,635,854 | B1 | 12/2009 | Babin | |
| 7,663,130 | B1 | 2/2010 | Yarbrough et al. | |
| 7,710,567 | B1 * | 5/2010 | Mentzer | G01F 23/2924 250/577 |
| 7,872,746 | B2 * | 1/2011 | Gao | A61M 1/0023 356/246 |
| 8,058,635 | B2 | 11/2011 | Cierullies et al. | |
| 8,338,811 | B2 | 12/2012 | Lang et al. | |
| 2008/0011970 | A1 | 1/2008 | Mruk et al. | |
| 2009/0223290 | A1 | 9/2009 | Dietz et al. | |
| 2010/0032593 | A1 | 2/2010 | Yarbrough et al. | |
| 2010/0134303 | A1 * | 6/2010 | Perkins | A61M 5/1684 340/619 |
| 2010/0192699 | A1 | 8/2010 | Gao | |
| 2012/0279987 | A1 * | 11/2012 | Ophardt | A47K 5/1205 222/23 |
| 2015/0157168 | A1 | 6/2015 | Burrows | |
| 2015/0346017 | A1 * | 12/2015 | LePort | G01F 23/268 250/577 |
| 2020/0096377 | A1 * | 3/2020 | Agarwal | G01F 23/296 |

* cited by examiner

APPARATUSES AND METHODS FOR OPTICALLY MONITORING FLUID LEVEL IN A CONTAINER, SUCH AS A BATTERY, USING A NON-CONTACT OPTICAL DETECTOR ON AN OUTSIDE SURFACE OF THE CONTAINER

PRIORITY APPLICATION

The present application claims priority to U.S. Provisional Patent Application Ser. No. 62/340,737, filed on May 24, 2016 entitled "Optically Monitoring Fluid Level in a Container, Such as a Battery, Using a Non-Contact Optical Detector on an Outside Surface of the Container," which is incorporated herein by reference in its entirety.

BACKGROUND

I. Field of the Disclosure

The technology of the disclosure relates generally to optically monitoring a fluid level in a container, such as the level of an electrolyte in a battery, particularly a battery in a battery power system, such as an uninterrupted power supply (UPS) or DC charger for stationary battery, using a non-contact optical detector on an outside surface of the container.

II. Background

An industrial system may rely on a stationary battery system to provide backup power in the event of failure of a primary power system. The stationary battery may be provided in the form of a number of lead acid battery cells electrically connected in series. A battery charger is provided that keeps the battery cells charged in the event backup power is needed from the battery cells. However, each battery cell will eventually fail. For example, lead acid batteries may lose the ability to accept a charge when discharged over time due to sulfation. Or a battery may fail due to the level of fluid in the battery becoming too low. A battery containing one or more failed battery cells may be unable to power the industrial system at specified battery operating voltages, at specified battery operating currents, and/or for designed battery discharge durations.

Accordingly, an industrial system may employ a battery monitoring system to monitor the state-of-health (SOH) of battery cells in a backup power supply. A battery cell which has been detected to have the impending failure or to have failed may be replaced or in the case of low electrolyte levels may be filled to restore the proper performance.

There are standards that set out the maintenance requirements for these types of monitoring systems. For example, the North American Electric Reliability Corporation (NERC) has instituted PRC-005, which implements programs for the maintenance of all protection systems (including batteries and battery monitoring systems) affecting the reliability of Bulk Electric Systems (BES) so that these protection systems are kept in working order. As part of the NERC PRC-005 standard, the level of an electrolyte fluid for vented lead acid containers in the batteries of a stationary battery is monitored to ensure that the level of the electrolyte fluid does not fall below a threshold level that may cause the battery to fail or not perform to acceptable specifications. However, the batteries of an stationary battery may be in remote locations where there is little to no human personnel to check the electrolyte level. Accordingly, a need exists to be able to remotely monitor the level of the electrolyte fluid in the batteries of an stationary battery and optionally generate an alarm if the level of an electrolyte fluid falls below a threshold level that would cause the battery to fail.

Capacitive or sonic techniques for measuring the level of a fluid in a container exist, but are unreliable, difficult to install, or cost-prohibitive due to the properties of the fluid or the container (low dielectric value, differences in the container design, differences in the placement of the lead plates, surface tension, viscosity, conductivity, charge potential, etc.) or properties of the environment (electrical noise, mechanical vibration, etc.). In addition, there are also sensors for measuring fluid level that are immersed in the fluid they are measuring. There are also sensors that detect the level from above the fluid; however, these are invasive and require access to the inside of the container, usually from the top. These sorts of sensors do not work in certain environments, such as in an electrolyte fluid in a battery cell, due to the acidic and corrosive nature of the electrolyte fluid. They also are not acceptable if the container must be opened or the singular access point for refilling the container is obstructed by the measurement device. A non-contact, external, optical fluid level detector for optically monitoring a level of a fluid in a container is therefore needed.

SUMMARY OF THE DISCLOSURE

Embodiments disclosed in the detailed description include optically monitoring a fluid level in a container, such as an electrolyte in a battery, using a non-contact optical detector on an outside surface of the container. Related components, systems, and methods are also disclosed. In one embodiment, an apparatus for optically monitoring a level of a fluid in a container is disclosed. The apparatus comprises one or more light emitters and a plurality of optical detectors. The one or more light emitters are configured to emit a light toward a target surface when positioned, at a fluid threshold level, on or near an outside surface of a container having at least some fluid within the container. In one embodiment, the target surface may be the fluid inside the container or an object submerged in the container, such as a battery electrode in the case of a battery cell. In another embodiment, the target surface may be another surface of the container, such as a wall opposite the outside surface on which the one or more light emitters and the plurality of optical detectors are positioned. The plurality of optical detectors comprise an upper optical detector and a lower optical detector, each of which is configured to receive light emitted from the one or more light emitters and reflected from the target surface when positioned on the outside of the container above and below the threshold level.

The apparatus further comprises a control system. The control system is configured to receive information relating to a measured reflectance of light received by the upper optical detector and a measured reflectance of light received by the lower optical detector. The control system is also configured to detect, based on the measured reflectance received by the upper optical detector, whether the upper optical detector is above a level of the fluid within the container. The control system is further configured to detect, based on the measured reflectance received by the lower optical detector, whether at least a portion of the lower optical detector is above the level of the fluid within the container. The control system then determines, based on whether the upper optical detector is above the level of the fluid within the container and whether at least a portion of the lower optical detector is above the level of the fluid within the container, whether the level of fluid within the container has dropped below the fluid threshold level.

Optionally, in one embodiment, the apparatus is further configured to generate an alarm based on the determination that the level of fluid in the container has dropped below a threshold level. In one embodiment, the apparatus may include a control system comprising a memory that is configured to store a calibration reflectance of both detectors when the container is at a designated full level and both detectors are receiving light reflected through the fluid from the target surface, and use the stored calibration reflectance to make the determination whether the level of fluid in the container has dropped below a threshold level.

In another embodiment, a method of optically detecting a level of a fluid in a container is disclosed. The method comprises emitting, at periodic intervals, a light from one or more light emitters toward a target surface, the one or more light emitters configured to be positioned, at a fluid threshold level, on or near an outside surface of a container having at least some fluid within the container above the lower detector. In one embodiment, the target surface may be the fluid inside the container or an object submerged in the container, such as a battery electrode in the case of a battery cell. In another embodiment, the target surface may be another surface of the container, such as a wall opposite the outside surface on which the one or more light emitters and the plurality of optical detectors are positioned. The method also comprises measuring reflectance of light reflected from the target surface and received at each of a plurality of optical detectors, the plurality of detectors configured to be positioned on the outside surface of the container on opposite sides of the fluid threshold level. The method further comprises detecting, based on the measured reflectance received by the upper optical detector, whether the upper optical detector is above a level of the fluid within the container. The method further comprises detecting, based on the measured reflectance received by the lower optical detector, whether at least a portion of the lower optical detector is above the level of the fluid within the container. A determination is then made whether the level of fluid within the container has dropped below the fluid threshold level, based on whether the upper optical detector is above the level of the fluid within the container and whether at least a portion of the lower optical detector is above the level of the fluid within the container.

Optionally, in one embodiment, the method may further comprise generating an alarm based on the determination that the level of fluid in the container has dropped below a threshold level. In one embodiment, the method may further comprise storing a calibration reflectance of the plurality of detectors when the container is at a designated full level and each of the plurality of detectors is receiving light reflected through the fluid from the target surface and using the stored calibration reflectance to make the determination whether the level of fluid in the container has dropped below a threshold level.

BRIEF DESCRIPTION OF THE FIGURES

FIG. 4 shows where a fluid level is above the range demarcated by an upper optical detector according to embodiments disclosed herein;

FIG. 5 shows where a fluid level is below the range demarcated by a lower optical detector according to embodiments disclosed herein;

FIG. 6 shows a fluid level inside the upper region according to embodiments disclosed herein;

FIG. 7 shows a fluid level inside the lower region according to embodiments disclosed herein;

FIG. 8 shows a fluid level centered on an axis of the light emitter and the threshold according to embodiments disclosed herein;

DETAILED DESCRIPTION

Figure 1:
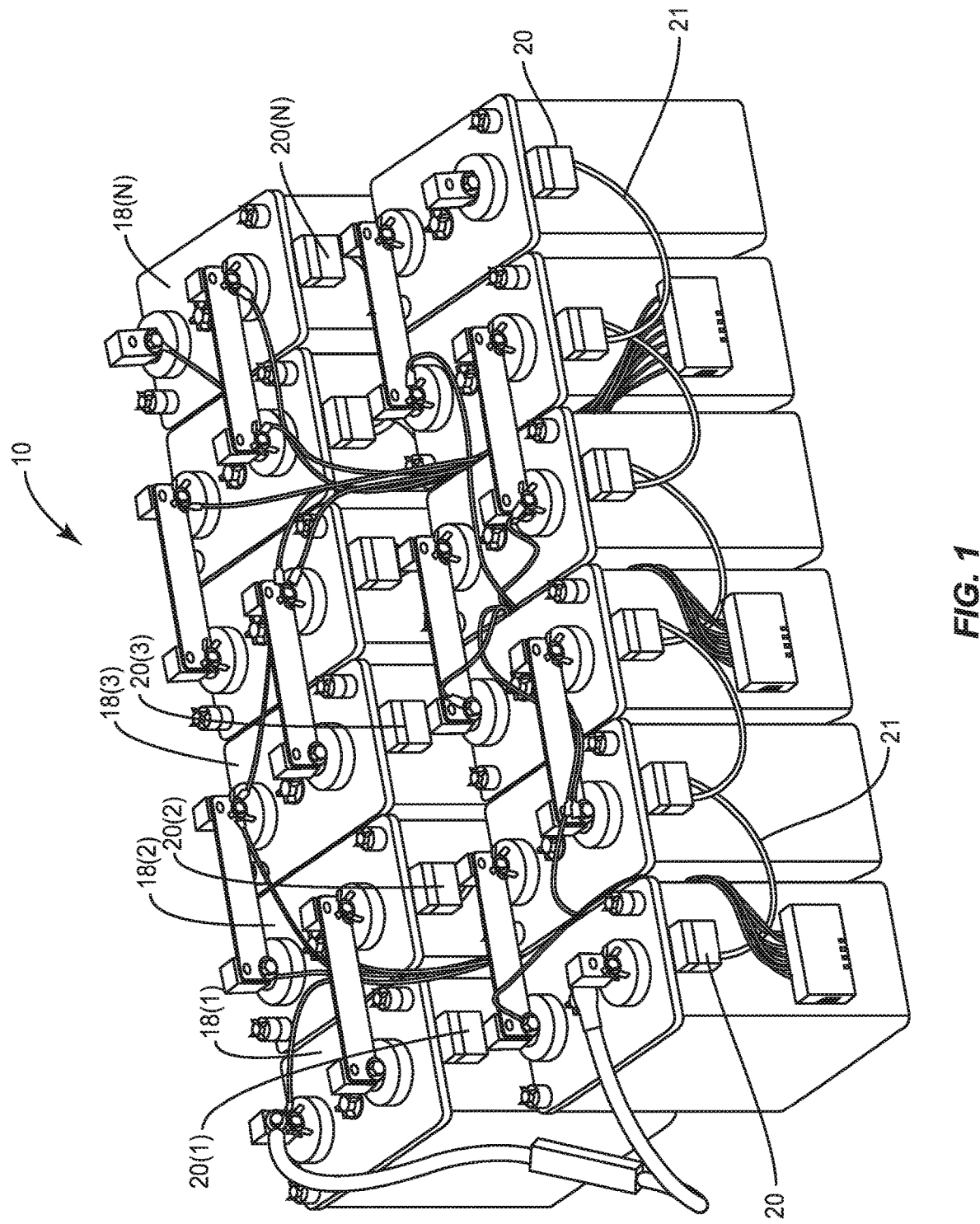
FIG. 1 is a block diagram of a series of battery cells with associated optical fluid level detectors, where each of the battery cells has a respective one of the optical fluid level detectors placed on an outside surface of the respective battery cells, according to embodiments disclosed herein.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include optically monitoring a fluid level in a container, such as an electrolyte in a battery, using a non-contact optical detector on an outside surface of the container. Related components, systems, and methods are also disclosed. In one embodiment, an apparatus for optically monitoring a level of a fluid in a container is disclosed. The apparatus comprises one or more light emitters and a plurality of optical detectors. The one or more light emitters are configured to emit a light toward a target surface when positioned, at a fluid threshold level, on an outside surface of a container having at least some fluid within the container. In one embodiment, the target surface may be an object submerged in the container, such as a battery electrode in the case of a battery cell, or in another embodiment, the target surface may be another surface of the container, such as a wall opposite the outside surface on which the one or more light emitters and the plurality of optical detectors are positioned. The plurality of optical detectors comprise an upper optical detector and a lower optical detector, each of which is configured to receive light emitted from the one or more light emitters and reflected from the target surface when positioned on the outside of the container on opposite sides of the threshold level.

The apparatus further comprises a control system. The control system is configured to receive information relating to a measured reflectance of light received by the upper optical detector and a measured reflectance of light received by the lower optical detector. The control system is also configured to detect, based on the measured reflectance received by the upper optical detector, whether the upper optical detector is above a level of the fluid within the container. The control system is further configured to detect, based on the measured reflectance received by the lower optical detector, whether at least a portion of the lower optical detector is above the level of the fluid within the container. The control system then determines, based on whether the upper optical detector is above the level of the fluid within the container and whether at least a portion of the lower optical detector is above the level of the fluid within the container, whether the level of fluid within the container has dropped below the fluid threshold level.

There are many commercial systems in which it may be desired to monitor the level of fluid in a container. For example, in one embodiment, there are standards that set out maintenance requirements for battery monitoring systems. For example, NERC PRC-005 implements programs for the maintenance of all protection systems (such as batteries and battery monitoring systems) affecting the reliability of Bulk Electric Systems (BES) so that these protection systems are kept in working order. As part of the NERC PRC-005 standard, the level of electrolyte in the batteries of a back up power system must be monitored to ensure that the level of electrolyte does not fall below a threshold level that would cause the battery to fail. However, the batteries of an backup power system may be in remote locations where there is little to no human personnel to check the electrolyte level. Accordingly, a need exists to be able to remotely monitor the level of an electrolyte fluid in the batteries of a backup power system and generate an alarm if the level of the electrolyte fluid falls below a threshold level that would cause the battery to fail.

In this regard, FIG. 1 shows an exemplary battery monitoring system 10 that may include a series of battery cells 18(1)-18(N) with associated optical fluid level detectors 20(1)-20(N), where each of the battery cells 18(1)-18(N) has a respective one of the optical fluid level detectors 20(1)-20(N) placed on an outside surface of the respective battery cells 18(1)-18(N). The battery monitoring system 10 may monitor the level of an electrolyte fluid in the battery cells 18 and generate an alarm if the level of an electrolyte fluid falls below a threshold level that would cause the battery cells 18 to fail. The optical fluid level detectors 20(1)-20(N) may be electrically connected to each other in series, such as via electrical or fiber optic cables.

Figure 2:
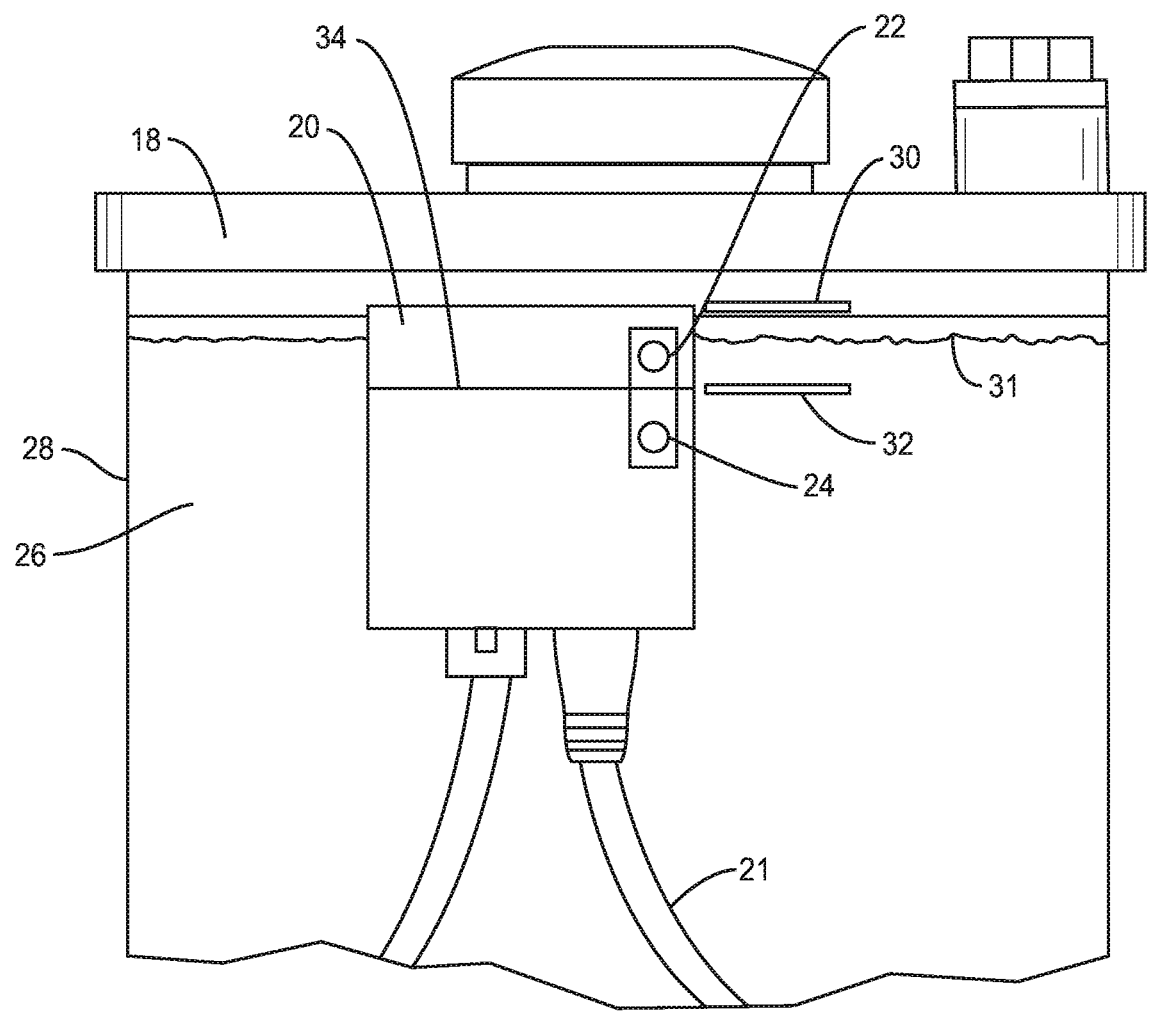
FIG. 2 illustrates a single exemplary optical fluid level detector positioned on an outside surface of a battery cell according to embodiments disclosed herein.

Referring now to FIG. 2, a close up view of a single optical fluid level detector 20 positioned on an outside surface of a battery cell 18 is shown. Although the optical fluid level detector 20 in FIG. 2 is shown as being positioned on a battery cell 18, it can be used with any container designed to hold a fluid and is not limited to use on battery cells in a battery monitoring system. In one embodiment, as shown in FIG. 2, the battery cell 18 is a closed container filled with a fluid, such as an electrolyte. The container making up the battery cell 18 may be formed of a clear or slightly opaque plastic, in one embodiment. The optical fluid level detector 20 may comprise a plastic housing with a first status indicator 22 and a second status indicator 24. In one embodiment, the first status indicator 22 and the second status indicator 24 may be LED lights, though they may take other forms. In one embodiment, the first status indicator 22 indicates (e.g., when it is lit) that a level of fluid in the battery cell 18 is above a given threshold level. The second status indicator 24 indicates (e.g., when it is lit) that a level of fluid in the battery cell 18 is below a given threshold level.

The battery cell 18 may be a rectangular container with four sides. Visible in FIG. 2 is a front outside surface 26 and a side outside surface 28. Not visible in FIG. 2 are sides opposite to front outside surface 26 and a side outside surface 28. In the embodiment shown in FIG. 2, the optical fluid level detector 20 is positioned on the front outside surface 26, but it may be placed on any of the four sides of the battery cell 18. The battery cell 18 is generally filled with a fluid, such as an electrolyte, when in operation. When being installed, the battery cell 18 may be filled with an electrolyte to a full level, as indicated by line 30. In FIG. 2, the fluid is at a fluid level 31. As long as the fluid level 31 remains above a threshold level, as indicated by line 32 (also referred to as threshold marker level 32), the battery cell 18 will have enough electrolyte to remain functional. In one embodiment, alignment marks may be placed on the same outside surface as the optical fluid level detector 20, in this case front outside surface 26, in order to visually indicate the full level 30 and the threshold marker level 32. In one embodiment, the optical fluid level detector 20 has an alignment mark 34 on its housing to aid in positioning the optical fluid level detector 20 on the front outside surface 26. In one embodiment, as shown in FIG. 3, the optical fluid level detector 20 is positioned on the front outside surface 26 of the battery cell 18 such that the alignment mark 34 is aligned with the lower threshold marker level 32 and a top of the optical fluid level detector 20 is aligned with the full level (upper limit) 30.

Figure 3:
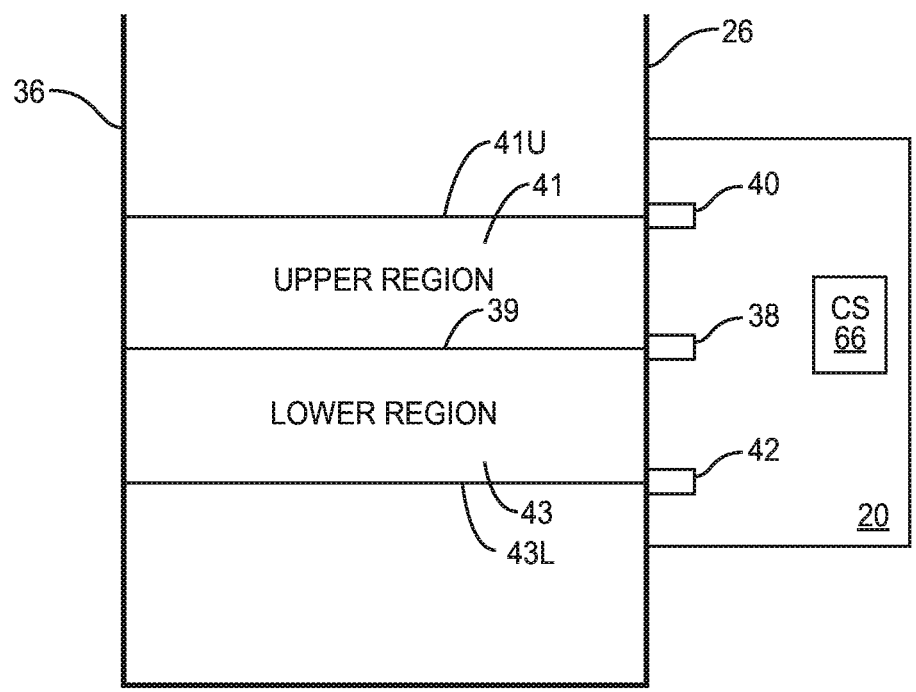
FIG. 3 illustrates an exemplary optical fluid level detector positioned on an outside surface of a container for monitoring a fluid level in the container according to embodiments disclosed herein.

Referring now to FIG. 3, an exemplary optical fluid level detector positioned on an outside surface of a container for monitoring a fluid level in the container is shown. In one embodiment, the container may be a battery cell 18 as shown in FIG. 2, or it can be any other container that is filled with fluid. The optical fluid level detector 20 may comprise a light emitter 38 and a plurality of optical detectors 40 and 42. In the embodiment shown in FIG. 4, a single light emitter 38 is shown, but one or more light emitters 38 may be used in other embodiments. The light emitter 38 may be a LED in one embodiment. In one embodiment, the light emitter emits infrared light. Likewise, in FIG. 3, two detectors—an upper optical detector 40 and a lower optical detector 42—are shown, but more than two optical detectors 40 and 42 can be used. In one embodiment, an array of optical detectors similar to optical detectors 40 and 42 may be used, such as a linear array of optical detectors. The optical detectors 40, 42 may take various forms. In one embodiment, they may comprise a receiver diode configured to receive light and measure an intensity of the received light.

In FIG. 3, the light emitter 38 is positioned on an outside surface 26 of the container opposite a secondary outside surface 36. Further, the light emitter 38 is aligned with a threshold 39. In one embodiment, by using the alignment mark 34 as shown in FIG. 2 on the housing of the optical fluid level detector 20 to aid in positioning the optical fluid level detector 20 on the front outside surface 26 such that the alignment mark 34 is aligned with the threshold marker level 32 and a top of the optical fluid level detector 20 is aligned with the full level 30, the light emitter 38 will be aligned with threshold 39. The light emitter 38 and the plurality of optical detectors 40 and 42 may be on or near the front outside surface 26 of the fluid-filled container on opposite sides of the threshold 39. In one embodiment, the light emitter 38 and the plurality of optical detectors 40 and 42 may be mounted on the front outside surface 26 of the fluid-filled container above and below the threshold 39, and in another embodiment, one or more of the light emitter 38 and the plurality of optical detectors 40 and 42 are positioned near the front outside surface 26, but do not physically touch the front outside surface 26.

Still referring to FIG. 3, the optical fluid level detector 20 further comprises a control system 66 that provides some intelligence for the optical fluid level detector 20. Thus, when discussing the functionality of the optical fluid level detector 20 in this application, the control system 66 may be providing that functionality. The control system 66 may include a processor, circuitry, or memory, as discussed in more detail below, in order to monitor the fluid level in the container and determine whether the level of fluid within the container has dropped below a fluid threshold level. In this regard, the optical fluid level detector 20 uses the reflective/refractive optical properties of the fluid-to-air boundary to determine the fluid level in a container relative to an established threshold with a high degree of accuracy. This method, referred to herein as the R/R method, is primarily intended for use in situations where the measurement apparatus should not come into contact with the fluid. In one embodiment, the R/R method is used as part of an electrolyte level detector system that detects the level of an electrolyte in a remote battery monitoring system to determine whether the electrolyte level has fallen below a desired threshold level. This will help the battery monitoring system be compliant with the North American Electric Reliability Corporation (NERC) PRC-005 standards.

Referring back to FIG. 3, the front outside surface 26 and the secondary surface 36 of the container or a portion thereof can be either transparent or tinted with a low degree of optical distortion (hereinafter referred to as the "Window"). The fluid being monitored is optically transmissive to some degree at some frequency, either directly or diffusely. The fluid's properties may remain constant or fluctuate over time. The secondary surface 36 (also referred to as "Target") is opposite the Window and is in a direct line of sight from the Window. This Target may be either flat or contoured with a wide range of acceptable textures, finishes, or colors. In one embodiment, the Target surface may be an object submerged in the container, such as a battery electrode in the case of a battery cell, or in another embodiment, the target surface may be another surface of the container, such as a wall opposite the outside surface on which the one or more light emitters and the plurality of optical detectors are positioned. In another embodiment, the Target might be the back surface of the container. The Target could also be any mechanical structures or fluids within the container.

As shown in FIG. 3, the optical fluid level detector 20 is affixed to the front outside surface 26 of the container Window. In one embodiment, the optical detectors 40 and 42 delineate the extent of R/R detection regions 41 and 43, with the light emitter 38 located midway between them at the threshold 39. The upper optical detector 40 delineates an upper level 41U of an upper region 41 and the lower optical detector 42 delineates a lower level 43L of a lower region 43. In one embodiment, higher accuracy is achieved by minimizing the vertical spacing between each of the upper optical detector 40, the light emitter 38, and the lower optical detector 42. In one embodiment, locating the upper and lower optical detectors 40, 42 approximately 3.81 millimeters (mm) to either side of the light emitter 38 can achieve a threshold detection with ±0.25 mm accuracy using 5 mm diameter devices (reference fluid is 40% sulfuric acid; meniscus width affects accuracy to some degree). In one embodiment, the spacing between each of the upper optical detector 40, the light emitter 38, and the lower optical detector 42 is chosen to exceed a width of a meniscus of the fluid. The optical fluid level detector 20 disclosed herein can provide economical and highly accurate fluid level threshold detection (determination of above-or-below a fixed point) with a minimum of factory calibration and installation setup.

In addition, the R/R method can be expanded to provide pseudo-analog fluid level measurements over a wide range by creating a line array of alternating light emitters and optical detectors.

In practice, most fluids absorb light to some degree at one or more frequencies. Light is therefore better reflected from a surface in a container if traveling through air than if traveling through a fluid. Thus, this difference in reflectance allows a rough threshold determination to be made that includes regions both above and below optical detectors, as shown in FIG. 3. This can allow an optical fluid level detector, such as those disclosed herein, to operate as a state machine without needing to know any previous fluid levels. This method is a functional convenience only; the optical fluid level detectors disclosed herein using the R/R method is not dependent on it in any way. Using historical values, the optical level fluid detectors disclosed herein can work with fluids having no absorption spectra whatsoever.

Referring again to FIG. 3, the area between the upper and lower optical detectors 40, 42 is divided into upper and lower regions 41, 43 which meet at the threshold 39. The optical fluid level detector 20 is mounted such that an axis of the light emitter 38 is centered on the meniscus when the fluid in the container is at the threshold 39. Fluid levels will be depicted as filling the area between the container walls, as indicated by front outside surface 26 and the secondary surface 36. When the optical fluid level detector 20 is operating, the light emitter 38 is configured to emit light, which shines through the front outside surface 26 and illuminates a section of the fluid or air in the container, and a section of the target (secondary surface 36, in this embodiment). In one embodiment, the light emitter 38 emits infrared light. The upper and lower optical detectors 40, 42 measure the light returned from the target to determine the level of the fluid between the optical detectors 40, 42.

The optical path of the light emitted from the light emitter 38 changes with the fluid level as it is reflected and refracted. Light is scattered by the fluid as it passes through the fluid, and the fluid absorbs more of the light than air, so the light received at the optical detectors 40, 42 when they are below a level of the fluid is less than when the optical detectors 40, 42 are above the level of the fluid.

Figure 4:
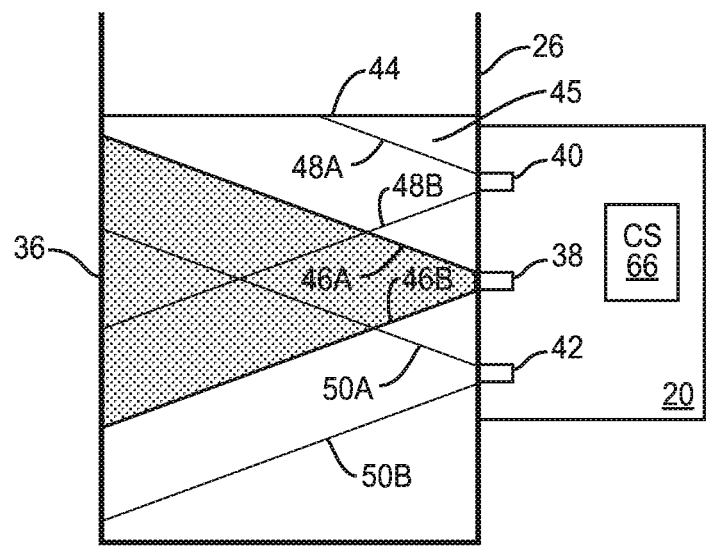
FIGS. 4 through 8 are exemplary schematics diagrams illustrating light reflected by a fluid boundary according to a level of the fluid when using the optical fluid level detector of FIG. 3 according to embodiments disclosed herein.
Figure 5:
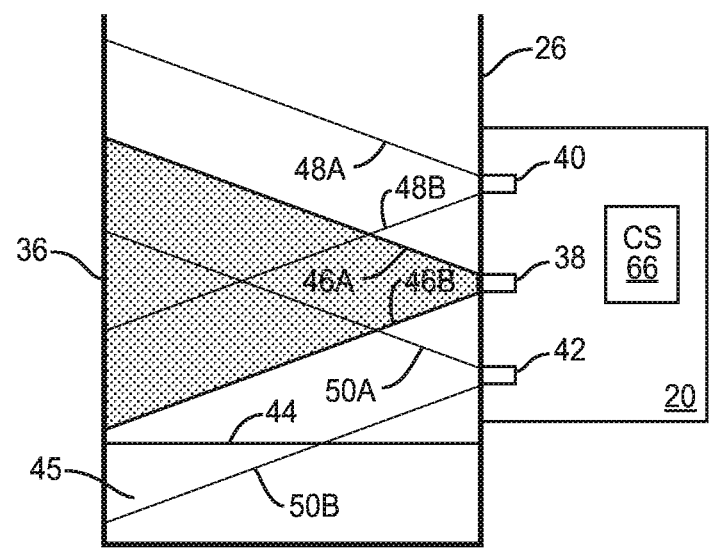
Figure 6:
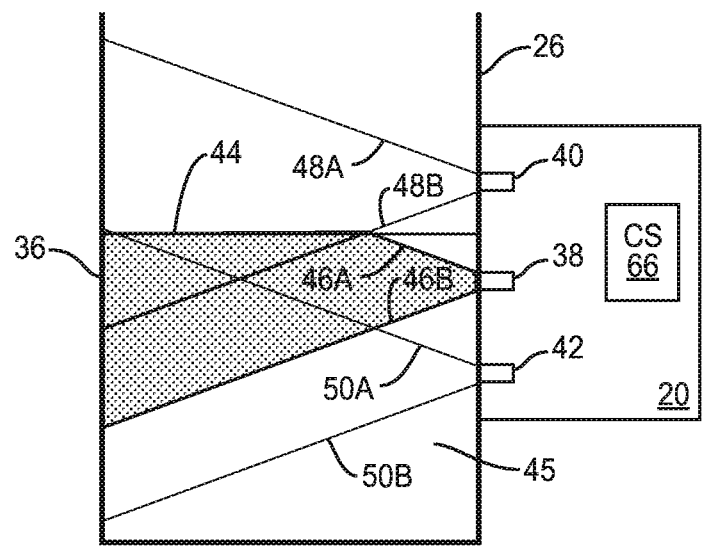

FIGS. 4 through 8 are exemplary schematics diagrams illustrating light reflected by a fluid boundary according to a level of the fluid when using the optical fluid level detector of FIG. 3. FIG. 4 shows where a fluid level 44 of a fluid 45 is above the range demarcated by the upper optical detector 40. FIG. 6 shows where a fluid level 44 of a fluid 45 is below the range demarcated by the lower optical detector 42. Because the situations in FIGS. 4 and 5 show the fluid level above and below the ranges demarcated by the upper and lower optical detectors 40, 42, respectively, the R/R method cannot reliably distinguish between them without knowing the historical location and ensuring the level of fluid has not passed the threshold since a given point in time. However, the optical fluid level detector 20 can use reflection to make this determination in situations where the fluid properties support it.

Accordingly, referring to FIG. 4, when the light emitter 38 emits light, rays 46A and 46B are transmitted through the fluid 45 toward the secondary surface 36. Light is reflected by the secondary surface 36, and the fluid back toward the front outside surface 26, though the light is also refracted by the fluid 45 as the light is transmitted through the fluid 45 toward the secondary surface 36 and as it is reflected by the secondary surface 36 back toward the front outside surface 26. The upper optical detector 40 can receive reflected light within the range denoted by 48A and 48B. The lower optical detector 42 can receive reflected light within the range denoted by 50A and 50B. In this case, since both the upper optical detector 40 and the lower optical detector 42 are below the level of the fluid 45, they will both be receiving light which has been refracted as it has passed through the fluid 45 and this reflected and refracted light will thus have a first given value or intensity.

Looking at FIG. 5, in this case, since both the upper optical detector 40 and the lower optical detector 42 are above the level of the fluid 44, they will both be receiving light which has not been refracted as it has passed through the fluid 45 and this reflected and refracted light will thus have a second given value or intensity, which is different than the first given value or intensity of the light received by the optical detectors 40, 42 in FIG. 4. This can be used to distinguish between the situations in FIGS. 4 and 5 and determine whether the upper and lower optical detectors 40, 42 are both below the fluid 45 (FIG. 4) or above the fluid 45 (FIG. 5).

Figure 7:
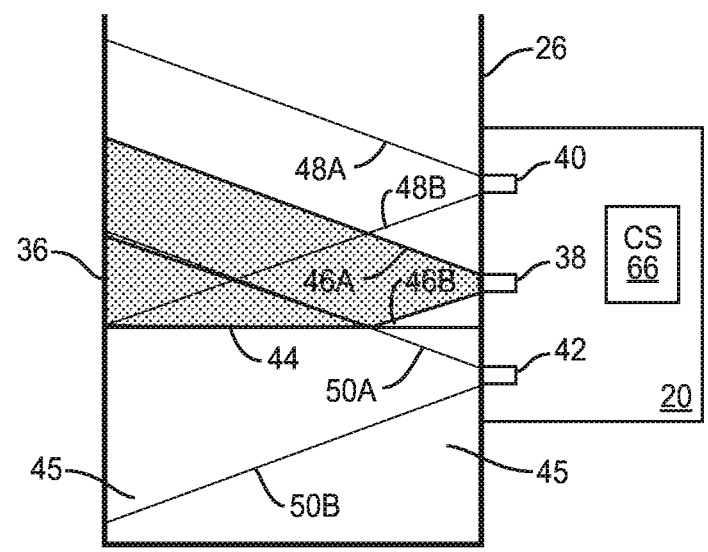

FIGS. 6 and 7 show the fluid level inside the upper and lower ranges (see upper region 41 and lower region 43 of FIG. 3). In both cases of FIGS. 6 and 7, the light from light emitter 38 is completely, or nearly completely reflected by the fluid-to-air boundary represented by the fluid level 44, reinforcing the intensity of light seen by the optical detector 40 or 42 on the same side of the boundary to a higher value than is seen in FIG. 4 or 5. The shallow angle of incidence ensures that almost no light is refracted through the boundary represented by the fluid level 44, reducing the intensity of light seen by the other upper optical detector 40 or lower optical detector 42 to secondary scatter (depicted angles are exaggerated for clarity.)

For example, in FIG. 6, the fluid level 44 of fluid 45 is between the light emitter 38 and the upper optical detector 40. In FIG. 6, the light from light emitter 38 is completely, or nearly completely, reflected by the fluid-to-air boundary represented by the fluid level 44, reinforcing the intensity of light seen by the lower optical detector 42, since it is on the same side of the boundary, to a higher value than is seen in FIG. 4 or 5. The upper optical detector 40 may receive light having less intensity than the light received by the lower optical detector 42.

Figure 8:
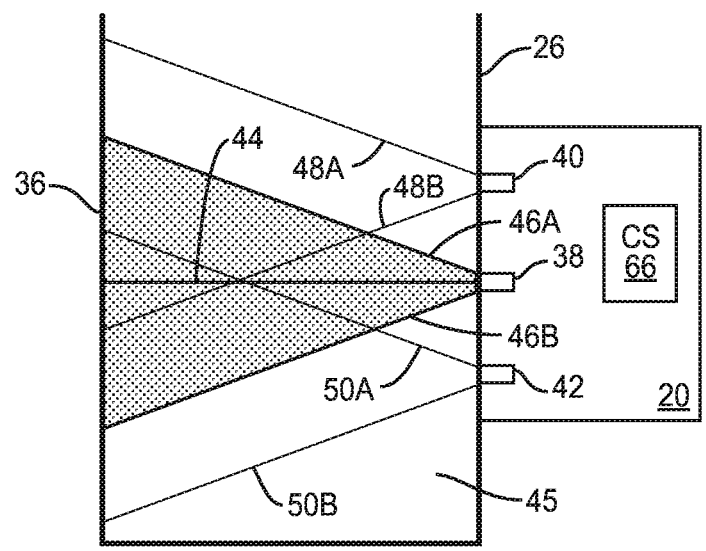

Conversely, in FIG. 7, the fluid level 44 of fluid 45 is between the light emitter 38 and the lower optical detector 42. In FIG. 7, the light from light emitter 38 is completely, or nearly completely, reflected by the fluid-to-air boundary represented by the fluid level 44, reinforcing the intensity of light seen by the upper optical detector 40, since it is on the same side of the boundary, to a higher value than is seen in FIG. 4 or 5. The lower optical detector 42 will receive light having less intensity than the light received by the upper optical detector 40. Referring now to FIG. 8, FIG. 8 shows where a fluid level 44 of a fluid 45 is centered on an axis of the light emitter 38 and the threshold 39. In this case, the ratio of the illumination in the upper region 41 (see FIG. 3) as opposed to that of the lower region 43 (see FIG. 3) (after accounting for absorption losses) changes radically as the meniscus (fluid level 44) transits the threshold 39 (which is also the axis of light emitter 38). For purposes of this Specification, the term "transit" refers to an event in which the fluid level 44 passes (i.e., drops below or rises above) a certain point, such as the threshold 39 or an axis associated with the light emitter or the optical detectors 40, 42 (see upper level 41U or lower level 43L in FIG. 3). In other words, the intensity of the light received at the upper optical detector 40 changes radically as a ratio to the intensity of light received at the lower optical detector 42 as the fluid level 44 drops below the threshold 39. This ratio may be used to determine whether the fluid level 44 is above or below the threshold 39.

Figure 9:
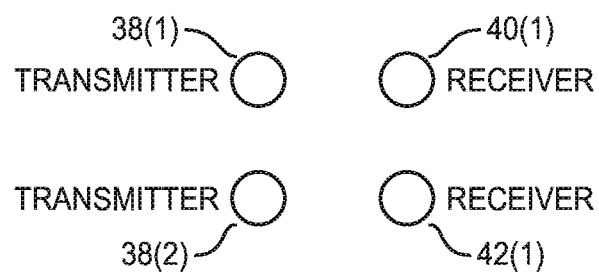
FIG. 9 is an exemplary schematic diagram of an alternate configuration of an optical fluid level detector, whereby a plurality of light emitters are aligned side by side with a corresponding plurality of optical detectors.

In another embodiment, an alternate configuration, as seen in FIG. 9, can be used for the one or more light emitters and the plurality of optical detectors. In the embodiment of FIG. 9, an alternate configuration is shown, whereby the one or more emitters (also known as a transmitter or TX diode) are aligned side by side with a corresponding optical detector (also known as a receiver or RX diode). For example, as seen in FIG. 9, an upper pair of TX and RX diodes and a lower pair of TX and RX diodes may be used. The upper pair may include a upper transmitter 38(1) and a corresponding upper receiver 40(1) aligned with the upper transmitter 38(1). The lower pair may include a lower transmitter 38(2) and a corresponding lower receiver 42(1) aligned with the lower transmitter 38(2). The upper transmitter 38(1) and the lower transmitter 38(2) may be similar to the light emitter 38 in FIG. 3. The upper receiver 40(1) and the lower receiver 40(2) may be similar to the optical detectors 40 and 42 in FIG. 3. The upper and lower pairs of transmitters 38(1) and 38(2) and corresponding receivers 40(1) and 42(1) may be positioned on or near an outside surface of a container containing fluid, such as the outside surface 26 of the container seen in FIGS. 3-8. In fact, the upper and lower pairs of transmitters 38(1) and 38(2) and corresponding receivers 40(1) and 42(1) can be used instead of the light emitter 38 and optical detectors 40 and 42 of FIGS. 3-8.

Referring to FIG. 9, the alternate configuration of the upper and lower pairs of transmitters 38(1) and 38(2) and corresponding receivers 40(1) and 42(1) can be used to detect whether a fluid level of a fluid in a container has dropped below a threshold fluid level. When both the upper and lower pairs are under the fluid (i.e., the upper transmitter 38(1) and its corresponding upper receiver 40(1) are both under the fluid level, as is the lower transmitter 38(2) and its corresponding lower receiver 42(1)), the reflection of light received at both the upper receiver 40(1) and the lower receiver 42(1) is low. In one embodiment, this level of reflection may be measured and stored as a calibration or reference reflectance. When both the upper and lower pairs are above the fluid (i.e., the upper transmitter 38(1) and its corresponding upper receiver 40(1) are both above the fluid level, as is the lower transmitter 38(2) and its corresponding lower receiver 42(1)), both the upper receiver 40(1) and the lower receiver 42(1) will measure a high reflectance relative to the reference reflectance.

As the fluid level drops from the container being full, the upper receiver 40(1) will measure a higher reflectance than the reference reflectance when the upper pair of diodes (the upper transmitter 38(1) and its corresponding upper receiver 40(1)) are above the fluid surface. As the fluid level drops, the reflectance measured at the lower receiver 42(1) of the lower pair of diodes will start to rise relative to the reference reflectance as the lower pair of diodes are exposes to air above the fluid level. As the fluid level continues to drop, the fluid level may pass a threshold level. In one embodiment, the threshold level may be considered to have been passed when the reflectance measured at the lower receiver 42(1) reaches a certain ratio as compared to the reference reflectance level, with the upper pair measuring a high reflectance at the upper receiver 40(1) relative to the reference reflectance. In one embodiment, the ratio may be when the reflectance level is approximately three times the reference reflectance. An alarm may be generated when the threshold level has been passed. In one embodiment, a factory calibration process may be used in any of the foregoing embodiments, whereby the optical fluid level detector 20 is calibrated by exposing it to both a white surface and a black trap. This ensures similar reflectance measurements from both of the upper and lower optical detectors 40, 42. Any difference in optical paths and sensitivities is calibrated out so measurements from the two optical detectors 40, 42 can be compared. After the optical fluid level detector(s) 20 have been installed on the battery cells 18, each optical fluid level detector 20 is site calibrated to the particular battery cell 18 to which it is attached. The battery cells 18 are filled to the top level mark (see full level 30) and above the upper optical detector 40 such that both upper and lower optical detectors 40, 42 are seeing reflected light through the fluid 45. The calibration reflectance of the light received at both the upper and lower optical detectors 40, 42 is stored. In one embodiment, the calibration reflectances stored in a memory in the optical fluid level detector 20, though it may be stored elsewhere. When both upper and lower optical detectors 40, 42 are below the fluid level 44, they detect a lower level of reflected light than when they are both above the fluid level 44. This is due to absorption of light by the fluid 45 relative the reflectance they detect when the fluid level 44 is below the optical detectors 40, 42, and the light is traveling though air.

After the optical detectors 40, 42 are calibrated with the fluid level 44 at the full level 30, then as the fluid level 44 drops, the upper optical detector 40 starts to see increases reflectance as it is exposed to air. As the fluid level 44 drops over the lower optical detector 42, its reflectance measurement starts to rise. In one embodiment, the optical fluid level detector 20 is configured to determine whether the level of fluid in the container has dropped below a threshold level by detecting when the measured reflectance received by an upper optical detector 40 of the plurality of optical detectors 40, 42 indicates that the upper optical detector 40 is above the level of the fluid, and the measured reflectance received by a lower optical detector 42 of the plurality of detectors 40, 42 indicates that at least a portion of the lower optical detector 42 is above the level of the fluid.

In one embodiment, the control system 66 can help receive information relating to a measured reflectance of light received by the upper optical detector 40 and a measured reflectance of light received by the lower optical detector 42 can be sent to the control system 66 of the optical fluid level detector 66. The control system 66 can then detect, based on the measured reflectance received by the upper optical detector 40, whether the upper optical detector 40 is above the fluid level 44. The control system 66 can also detect, based on the measured reflectance received by the lower optical detector 42, whether at least a portion of the lower optical detector 42 is above the fluid level 44. The control system 66 can then determine, based on whether the upper optical detector 40 is above the fluid level 44 and whether at least a portion of the lower optical detector 42 is above the fluid level 44, whether the fluid level 44 within the container has dropped below the threshold level 39.

In one embodiment, the optical fluid level detector 20 is configured to generate a level alarm based on this determination. In one embodiment, the optical fluid level detector 20 is configured to generate a level alarm when the following conditions are met:

The value of the intensity of light received at the upper optical detector 40 is approximately 2.5 times greater than the calibration level of the upper optical detector 40 (this indicates the upper optical detector 40 is above the level of the fluid).

The value of the intensity of light received at the lower optical detector 42 is approximately 2.5 times greater than the calibration level of the lower optical detector 42 (this indicates that at least a portion of the lower optical detector 42 is above the level of the fluid).

The value of the intensity of light received at the lower optical detector 42 is greater than approximately 0.3 times value of the intensity of light received at the upper optical detector 40 (this indicates the lower optical detector 42 is only partially above the level of the fluid).

If the above conditions are met, an alarm will be generated when the fluid level 44 is approximately half way across the lower optical detector 42.

This method of detecting the low level alarm gives an accuracy of about 1 mm. It also provides a few millimeters (mm) of hysteresis in that the level at which the alarm trips at is higher up the lower optical detector 42 when the fluid level 44 rises than it is as the fluid level 44 falls. This prevents false or oscillating alarms as once the unit trips it stays tripped until the fluid level 44 rises by a few millimeters.

The amount of illumination (or intensity value) at the optical detectors 40, 42 is heavily influenced by the fluid opacity and clarity as well as the reflectivity of the target (e.g., secondary surface 36) under both submerged and exposed conditions. As a result, using the passing of an axis of the light emitter 38 to determine the threshold level requires knowing these values in advance in the form of calibration values. This is not always practical or possible.

Ideally, the optical fluid level detector 20 should be installable on a functioning fluid system without interrupting or influencing its operation in any way. Therefore, the only required site calibration values will preferably be the initial levels measured when the system is under normal or safe conditions. All other variables may be accommodated by the optical fluid level detector 20 in its operation. In one embodiment, the normal or safe condition can be assumed where the light emitter 38 and the upper and lower optical detectors 40, 42 are either completely above or completely below the fluid level 44, and the optical fluid level detector 20 can be programmed for which of these two conditions applies.

A process of Trailing Edge Detection can be used to minimize the calibration requirements. Trailing Edge Detection uses a transit of an axis associated with a second optical detector to determine the threshold level based on readings from the transits of the light emitter and a first optical detector. In the case where the "normal" condition is a high fluid level, the second optical detector is the lower optical detector 42. In the case where the "normal" condition is a low fluid level, the second optical detector is the upper optical detector 40.

Figure 10:
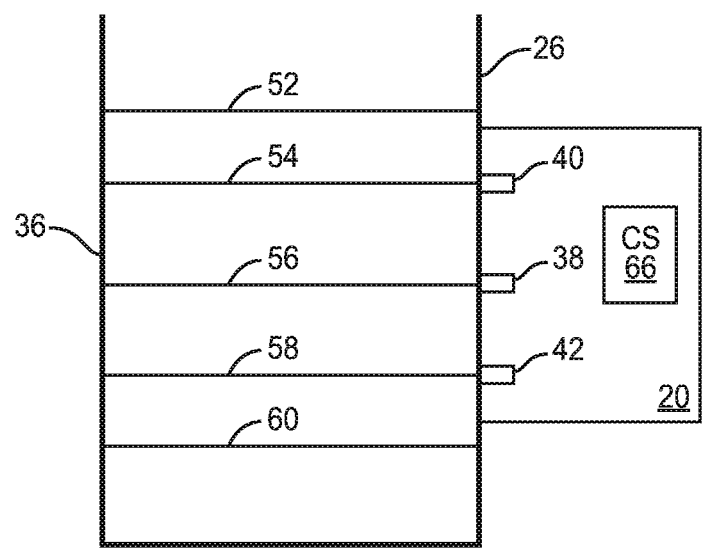
FIG. 10 shows various fluid levels used as reference points according to embodiments disclosed herein.
Figure 11:
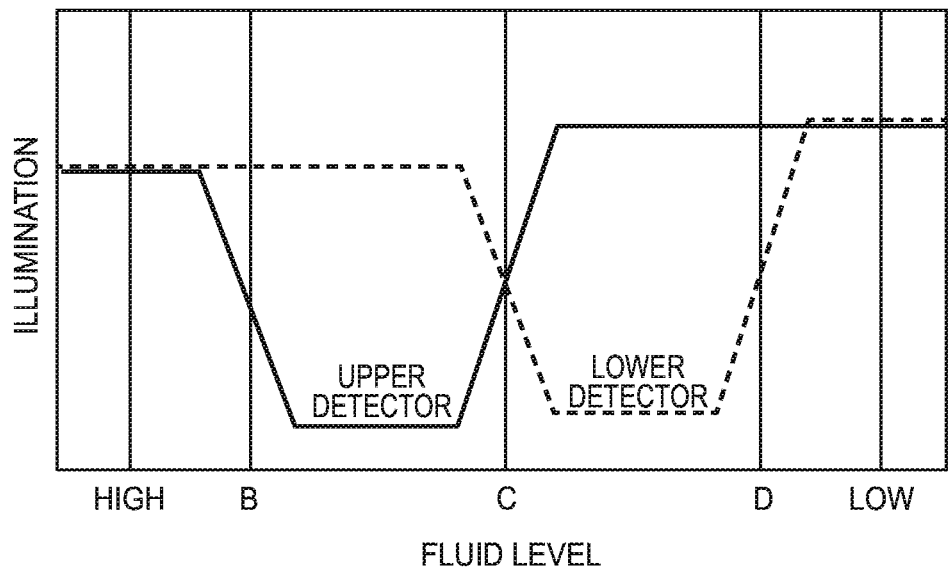
FIG. 11 shows relative illuminations for upper and lower optical detectors for a high transmissivity fluid according to embodiments disclosed herein.
Figure 12:
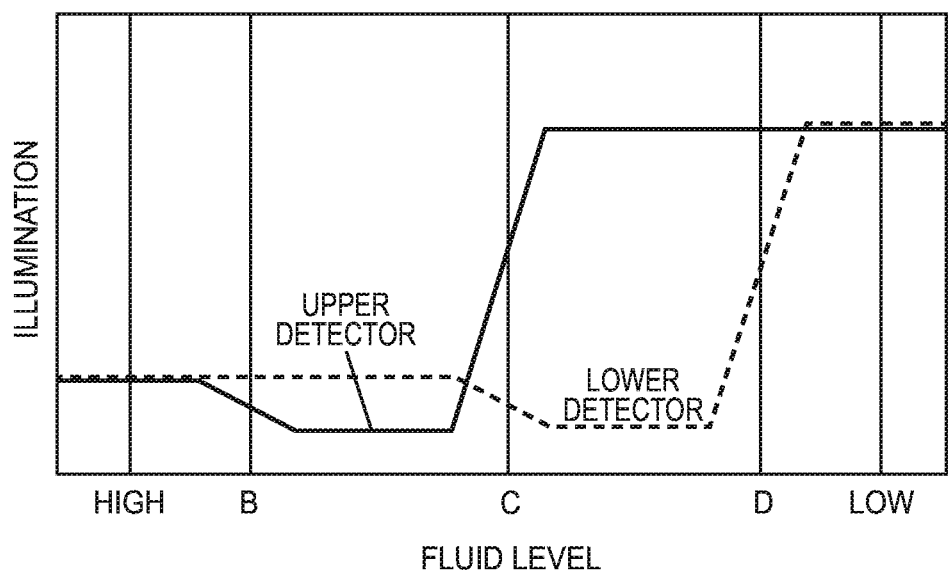
FIG. 12 shows relative illuminations for upper and lower optical detectors for a low transmissivity fluid according to embodiments disclosed herein.

FIGS. 10-12 illustrate how Trailing Edge Detection can accurately detect the threshold level knowing only the initial readings under "normal" conditions and accounting for the transmissivity of the fluid. These examples detail the high-to-low transition of a normally high fluid system (such as where the container is filled with fluid to a full level 30, see FIG. 2).

FIG. 10 shows the fluid levels used as reference points in these examples. FIG. 11 shows the relative illuminations of the upper and lower detectors 40, 42 for a high transmissivity fluid.

The various reference levels as shown in FIG. 10 are high level 52, B level 54, C level 56, D level 58, and low level 60. High level 52 is where the level of the fluid is above both the upper and lower optical detectors 40, 42. B level 54 represents where the level of the fluid is at an axis of the upper optical detector 40. C level 56 represents where the level of the fluid is at an axis of the light emitter 38. D level 58 represents where the level of the fluid is at an axis of the lower optical detector 42. Low level 60 represents where the level of the fluid is below both the upper and lower optical detectors 40, 42.

Referring to both FIGS. 10 and 11, as the fluid level 44 drops from the initial high level 52, the fluid level first transits the upper optical detector 40 at B level 54. This causes the illumination of light received at the upper optical detector 40 to drop as it becomes blocked from the light emitter 38. The optical fluid level detector 20 notes the decrease in the value of illumination of light received at the upper optical detector 40 in conjunction with a non-decreasing value of illumination of light received at the lower optical detector 42. Based on this, the optical fluid level detector 20 can determine that the fluid level 44 has transitioned into the upper region 41 as shown in FIG. 3.

The fluid level 44 next transits the light emitter 38 at C level 56, and the light from the light emitter 38 becomes at least partially blocked from being received at the lower optical detector 42, while the upper optical detector 40 becomes at least partially unblocked. Thus, the optical fluid level detector 20 notes the decrease in the value of illumination of light received at the lower optical detector 42 in conjunction with an increasing value of illumination of light received at the upper optical detector 40. Based on this, the optical fluid level detector 20 can determine that the fluid level 44 has transitioned into the lower region 43.

The fluid level 44 next transits the lower optical detector 42 at D level 58, unblocking the lower optical detector 42 from the light emitter 38. The optical fluid level detector 20 notes the increase in the value of illumination of light received at the lower optical detector 42 coupled with a non-decreasing value of illumination of light received at the upper optical detector 40. Based on this, the optical fluid level detector 20 can determine that the fluid level 44 has transitioned out of the lower region 43. At this point, the optical fluid level detector 20 begins looking at the ratio of the value of illumination of light received at the upper optical detector 40 and the value of illumination of light received at the lower optical detector 42. Once the ratio exceeds a predetermined constant, the optical fluid level detector 20 determines that the fluid level 44 is at the threshold level. In one embodiment, the predetermined constant for the ratio at which it is determined that the fluid level 44 is at the threshold is approximately 0.5. In another embodiment, the predetermined constant for the ratio at which it is determined that the fluid level 44 is at the threshold is approximately 0.3.

FIG. 12 shows the relative illuminations of the optical detectors 40, 42 for a low transmissivity fluid. Note that the illumination crossover point between the upper and lower optical detectors 40, 42 during the transit of the light emitter 38 occurs toward the beginning of the transit and not at the axis. However, the optical fluid level detector 20 still is able to correctly interpret the transition from one region to the next and a similar predetermined constant marks the threshold point directly on axis of the lower optical detector 42.

Figure 13:
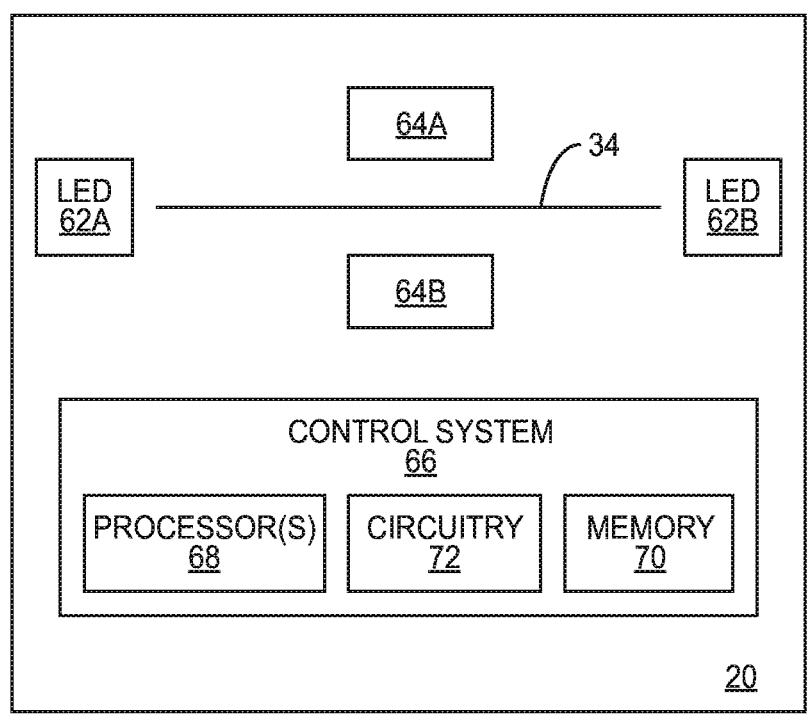
FIG. 13 is a block diagram of an exemplary optical fluid level detector configured to optically monitor when a fluid level in a container falls below a threshold level, comprising a plurality of light emitters, a plurality of optical detectors, and a control system comprising one or more processors, circuitry, and memory, according to embodiments disclosed herein

The methods discussed herein may include steps that are performed by the optical fluid level detector 20, though in other embodiments, the steps may be performed by other devices. An exemplary optical fluid level detector 20 is shown in FIG. 13. The optical fluid level detector 20 of FIG. 13 can be used in the apparatuses shown in FIGS. 2-10. As seen in FIG. 13, the optical fluid level detector 20 may comprise a pair of light emitters 62A and 62B configured to emit light, such as LEDs. In one embodiment, the light emitters 62A and 62B are aligned with alignment mark 34 so that when the optical fluid level detector 20 is positioned on an outside surface of the container, the light emitters 62A and 62B are positioned at the threshold level. The optical fluid level detector 20 also comprises a pair of optical detectors 64A and 64B positioned on opposite sides of the threshold level, as discussed above.

In addition, the optical fluid level detector 20 may comprise a control system 66, which may include processor(s) 68, a memory 70, and circuitry 72 capable to carry out the methods described herein. For example, the control system 66, through its processor(s) 68 and/or memory and/or circuitry 72, may perform the steps of determining whether a fluid level has dropped below a threshold level, as described herein.

In particular, the control system 66 is configured to receive information relating to a measured reflectance of light received by the upper optical detector and a measured reflectance of light received by the lower optical detector. The control system 66 is also configured to detect, based on the measured reflectance received by the upper optical detector, whether the upper optical detector is above a level of the fluid within the container. The control system 66 is further configured to detect, based on the measured reflectance received by the lower optical detector, whether at least a portion of the lower optical detector is above the level of the fluid within the container. The control system 66 may then determine, based on whether the upper optical detector is above the level of the fluid within the container and whether at least a portion of the lower optical detector is above the level of the fluid within the container, whether the level of fluid within the container has dropped below the fluid threshold level.

Figure 14:
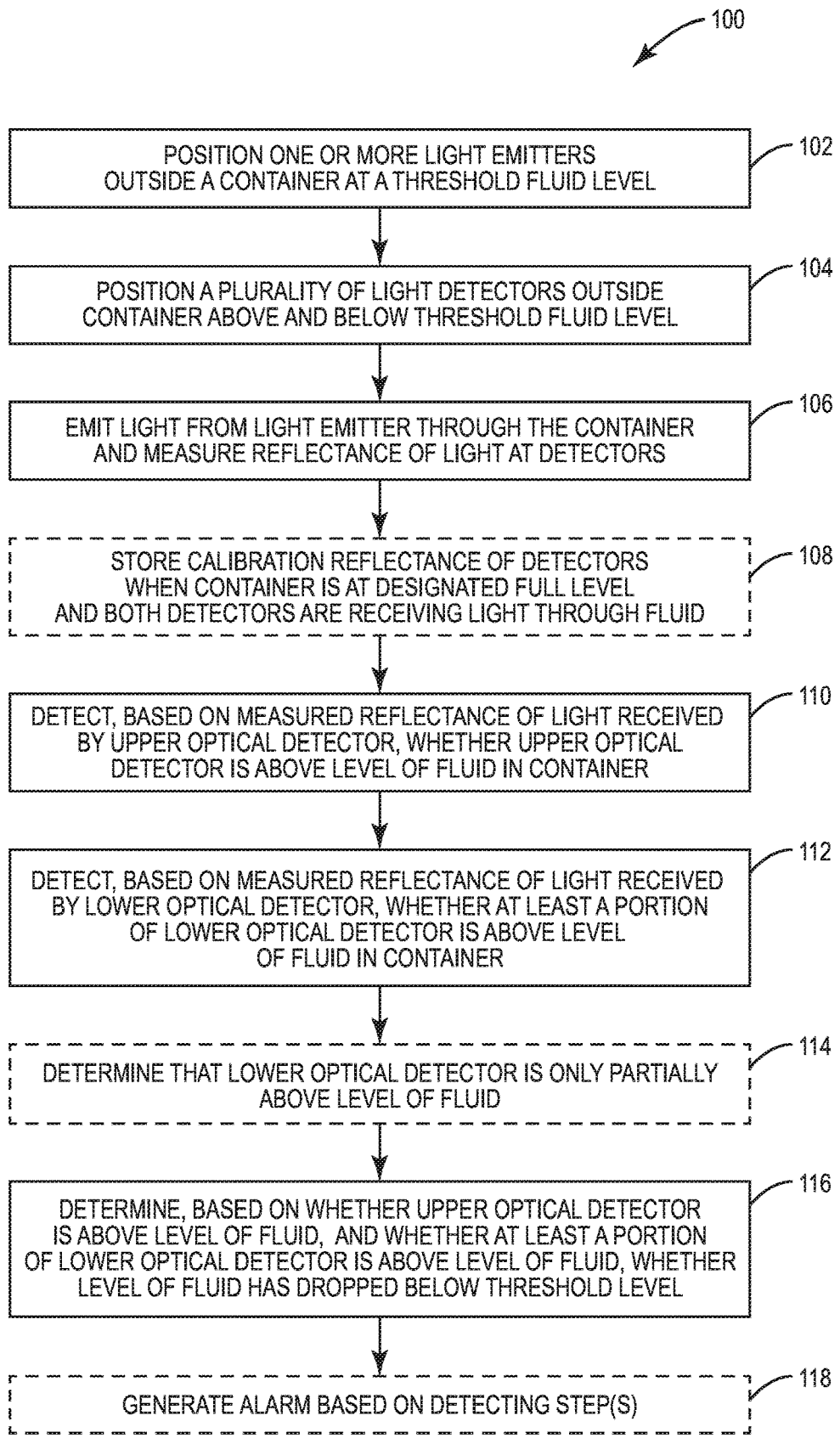
FIG. 14 is a flow chart illustrating an exemplary method of the optical fluid level detector in FIGS. 4 and 13 optically monitoring when a fluid level in a container falls below a threshold level, according to embodiments disclosed herein.

FIG. 14 is a flow chart illustrating an exemplary method of the optical fluid level detector in FIGS. 4 and 13 optically monitoring when a fluid level in a container falls below a threshold level. The method 100 comprises positioning one or more light emitters on an outside surface of a container configured to hold fluid at a threshold fluid level (step 102), and positioning a plurality of detectors on or near the outside surface of the container above and below the threshold fluid level (step 104). In one embodiment, the plurality of detectors can be on opposite sides of the one or more light emitters. At periodic intervals, in step 106, light is emitted from the one or more light emitter through the container and the reflectance of the light at the each of the plurality of detectors is measured. Optionally, the method may further comprise storing a calibration reflectance of the plurality of detectors when the container is at a designated full level (step 108). At step 110, a control system (such as control system 66 in FIG. 13) detects, based on a measured reflectance of light received by a first, upper optical detector of the plurality of optical detectors, whether the upper optical detector is above a level of fluid in the container. At step 112, the control system detects, based on a measured reflectance of light received by a second, lower level detector of the plurality of optical detectors, whether at least a portion of the lower optical detector is above a level of fluid in the container. The method, at step 114, may also optionally determine that the second (lower) optical detector is only partially above the level of the fluid. In step 116, a determination is made, based on whether the upper optical detector is above the level of fluid in the container and whether at least a portion of the lower optical detector is above the level of fluid in the container, as to whether a level of the fluid has dropped below a threshold fluid level. Optionally, in one embodiment, the method may further comprise generating an alarm based on the determination that the level of fluid in the container has dropped below a threshold level (step 118). In one embodiment, the method may further comprise using the stored calibration reflectance (s) to make the determination as to whether the level of fluid in the container has dropped below a threshold fluid level.

Further, the optical fluid level detector 20 may be part of a battery monitoring system, such as the battery monitoring system 10 in FIG. 1, or the battery monitoring system 10' in FIG. 15 below. The optical fluid level detector 20 may be communicatively coupled to the battery monitoring system and can communicate with the rest of the battery monitoring system through appropriate mechanisms. For example, when the optical fluid level detector 20 determines that the level of fluid in the container has dropped below a threshold level using the methods disclosed herein, the optical fluid level detector 20 may communicate this fact to the battery monitoring system. The optical fluid level detector 20 and/or the battery monitoring system may then generate an alarm. For example, the optical fluid level detector 20 may light the second status indicator 24 (FIG. 3) that indicates that a level of fluid in the battery cell 18 is below a given threshold level, and/or may cause an audible alarm to be generated. In another embodiment, the optical fluid level detector 20 may communicate to the battery monitoring system that the level of fluid in the container has dropped below a threshold level and the battery monitoring system can generate an alarm and notify a user using any appropriate mechanism that the level of fluid in the container has dropped below a threshold level.

In another embodiment, the R/R method disclosed herein can be used to measure a range of fluid levels deriving a pseudo-analog value. Level determination to within any region between a light emitter and an optical detector is possible and the level of the fluid measured to within at least two millimeters (±2 mm).

This type of system can be implemented by positioning one or more light emitters (such as light emitter 38) and a plurality of optical detectors (such as optical detectors 40 and 42) that span the entire inner portion of a container, including both exposed portions (not under a fluid) and portions submerged under a fluid. In one embodiment, there may be a single emitter positioned at a top portion or at a bottom portion of the container and a plurality of optical detectors arranged in an array. In another embodiment, there may be an alternating array of light emitters and optical detectors. Taking a sequence of measurements along the linear array using each light emitter in conjunction with its two adjacent optical detectors (referred to as an emitter-detector triad) can produce a series of readings that can be analyzed to determine when the fluid level has entered a specific region. By substituting the linear portion of each emitter-detector triad for the time-based event sequence of the optical fluid level detector, it can be determined where the fluid level is detected instead of when.

Additionally, since the linear array covers both submerged and exposed areas, more concurrent information is available and extrapolation of the readings can provide greater resolution and accuracy by gauging the fluid level position within any given region.

The above disclosed methods and apparatuses provide improvements in optically monitoring a level of fluid in a container. By using the above disclosed methods and apparatuses, the level of electrolyte in the batteries of an UPS can be monitored remotely to ensure that the level of electrolyte does not fall below a threshold level that would cause the battery to fail, and an alarm may be generated if the level of the electrolyte fluid falls below a threshold level that would cause the battery to fail. These disclosed methods and apparatuses would comply with standards that set out maintenance requirements for battery monitoring systems, such as NERC PRC-005, which implements programs for the maintenance of all protection systems (such as batteries and battery monitoring systems) affecting the reliability of Bulk Electric Systems (BES) so that these protection systems are kept in working order.

Although some of the above embodiments specifically relate to monitoring the level of an electrolyte in a battery cell of a remotely located battery as part of a UPS, the methods and apparatuses are not so limited.

The monitoring of the level of fluid in the battery cells 18 of batteries 16, according to embodiments disclosed herein, may be provided in or integrated into any processor-based device. In this regard, FIG. 15 is a block diagram of an exemplary processor-based system that includes battery monitoring devices and/or control unit(s) for testing battery cells of a backup power supply, wherein one or more of the battery cells can include an optical fluid level detector configured to optically monitor when a fluid level in one or more of the battery cells falls below a threshold level, including but not limited to the optical level fluid detector in FIGS. 4 and 13. In this example, the battery monitoring system 10' comprises at least one battery monitoring system control unit 130 and a plurality of battery monitoring devices 14 (as a non-limiting example, battery monitoring devices 14(1)-14(4)). The battery monitoring system 10' may also comprise a battery circuit breaker (BCB) 124 for guarding the battery 16(4) from overcurrents. The BCB 124 may also provide a negative terminal 126 of the battery 16 and a positive terminal 128 of the battery 16 for external loading.

In this example, the battery monitoring system control unit 130 includes one or more processor(s) 152. The processor(s) 152 is coupled to a system bus 134. As is well known, the battery monitoring system control unit 130 communicates with other system devices on the system bus 134 by exchanging address, control, and data information over the system bus 134. For example, the processor(s) 152 can communicate memory access requests to a memory 136 across the system bus 134. Although not illustrated in FIG. 15, multiple system buses 134 may be provided wherein each system bus 134 constitutes a different fabric.

Other devices can be connected to the system bus 134. As illustrated in FIG. 15, at least one battery cell temperature sensor 116 may be coupled to the system bus 134 for receiving battery temperature measurements of one or more battery cells 18 of the battery 16(4). An ambient temperature sensor 118 may also be coupled to the system bus 134. At least one current sensor 120 for measuring the currents of the battery 16(4) may also be coupled to the system bus 134.

At least one network interface device(s) 138 may be coupled to a fiber optic network 139 to allow the battery monitoring system control unit 130 to communicate with the battery monitoring devices 14. Because the fiber optic network 139 is a fiber optic network, and not an electricity-conducting network, currents of the battery 16(4) flowing through the fiber optic network 139 are avoided.

The battery monitoring system control unit 130 may also comprise network interface device(s) 140 for communicating with a client computer 142 for accessing the battery monitoring system control unit 130 for monitoring and/or configuration by a user. The client computer 142 and/or battery monitoring system control unit 130 may alert the user to an impending failure or failure of a battery cell 18. The network interface device(s) 140 may be attached to a network 144. In one embodiment, the network 144 may be an RS-485 network, such as RS-485 network 145. Alternatively, the network 144 may be an Internet Protocol (IP) network or other network allowing other client computers 142 to access the battery monitoring system control unit 130. The network 144 may also allow the client computer 142 to access other battery monitoring system control units 130. The network interface device(s) 140 can be any device(s) configured to allow exchange of data to and from the network 144. The network 144 can be any type of network, including but not limited to, a wired or wireless network, a private or public network, a local area network (LAN), a wide area network (WLAN), and the Internet. The network interface device(s) 138,140 can be configured to support any type of communication protocol desired. The client computer 142 may be a desktop computer, a laptop computer, a tablet, or other client device.

Figure 15:
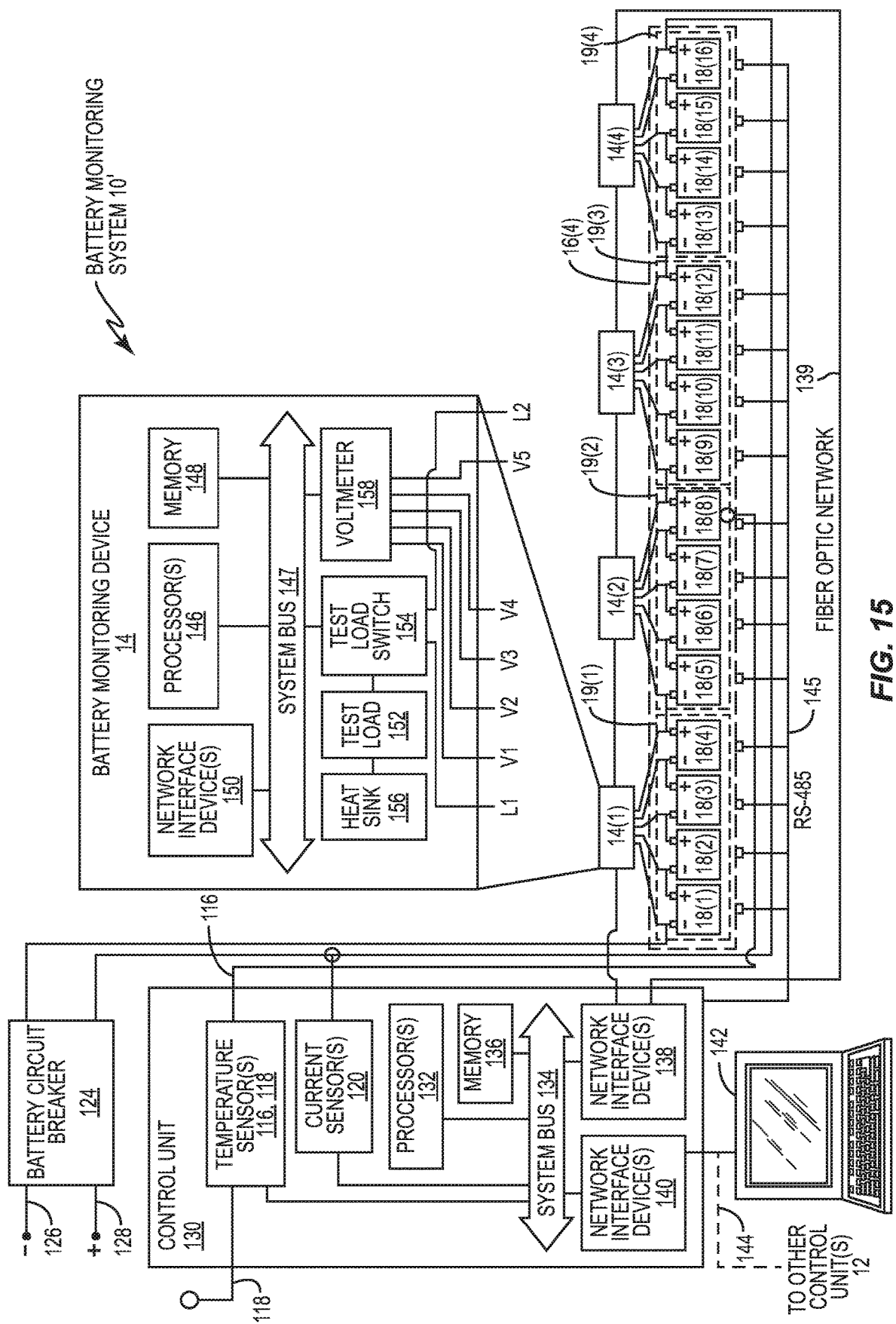
FIG. 15 is a block diagram of an exemplary processor-based system that includes battery monitoring devices and/or control unit(s) for testing battery cells of a backup power supply, wherein one or more of the battery cells can include an optical fluid level detector configured to optically monitor when a fluid level in one or more of the battery cells falls below a threshold level, including but not limited to the optical level fluid detector in FIGS. 4 and 13, according to embodiments disclosed herein.

As also illustrated in FIG. 15, the battery monitoring device 14 comprises processor(s) 146 coupled to a system bus 147. As is well known, the processor(s) 146 also communicate with other devices on the system bus 147 by exchanging address, control, and data information over the system bus 147. For example, the processor(s) 146 can communicate memory access requests to a memory 148. The battery monitoring device 14 also comprises network interface device(s) 150 configured to be coupled to the fiber optic network 139. The battery monitoring device 14 also comprises a resistive test load 152 used for inducing a current in the subset 19(1) of battery cells 18(1)-18(4) to which the battery monitoring device 14 is coupled. The resistive test load 152 is coupled to each end of a subset 19 of the battery cells 18 connected in series. The battery monitoring device 14 also comprises a test load switch 154 for coupling the resistive test load 152 to current leads L1, L2 for inducing a current in the subset 19 of the battery cells 18 in series. The test load switch 154 may be any kind of switch, including a field effect transistor (FET), or any other type of switch for coupling the resistive test load 152 to the subset 19 of the battery cells 18.

The battery monitoring device 14 also comprises a heat sink 156 for receiving dissipating heat generated by the resistive test load 152 when the resistive test load 152 is coupled to the subset 19 of the battery cells 18. The battery monitoring device 14 also comprises a voltmeter 158 having a plurality of voltage leads V1-V5, for measuring the voltages of each battery cell 18(1)-18(4) of the subset 19 of the battery cells 18, and to which the battery monitoring device 14 is configured to be coupled.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The battery monitoring system control units and battery monitoring devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus for optically monitoring a fluid level in a container comprising:
    a housing comprising:
        one or more light emitters configured to emit a light toward a target surface when the one or more light emitters are positioned, at a fluid threshold level, on or near an outside surface of a container having at least some fluid within the container, wherein the fluid threshold level is a predefined fixed level; and
        a plurality of optical detectors comprising an upper optical detector and a lower optical detector, wherein each of the plurality of optical detectors is configured to receive the light emitted from the one or more light emitters and reflected from the fluid and the target surface when the upper optical detector and the lower optical detector are positioned on or near the outside surface of the container, where the upper optical detector is positioned above the fluid threshold level and where the lower optical detector is positioned below the fluid threshold level;
        the housing having an alignment mark configured to aid in positioning the one or more light emitters on the outside surface of the container at the fluid threshold level; and
    a control system configured to:
        receive information relating to a measured reflectance of light received by the upper optical detector and a measured reflectance of light received by the lower optical detector;
        detect, based on the measured reflectance of light received by the upper optical detector, whether the upper optical detector is above a level of the fluid within the container;
        detect, based on the measured reflectance of light received by the lower optical detector, whether at least a portion of the lower optical detector is above the level of the fluid within the container; and
        determine, based on whether the upper optical detector is above the level of the fluid within the container and whether at least a portion of the lower optical detector is above the level of the fluid within the container, whether the level of the fluid within the container has dropped below the fluid threshold level.

2. The apparatus of claim 1, wherein the control system is further configured to detect that the lower optical detector is only partially above the level of the fluid, and wherein the control system is further configured to determine whether the level of the fluid within the container has dropped below the fluid threshold level based on detecting that the lower optical detector is only partially above the level of the fluid.

3. The apparatus of claim 1:
    wherein the apparatus further comprises a memory configured to store calibration reflectance values that represent a reflectance of light received at the respective upper and lower optical detectors when the container is at a designated full level and both the upper and lower optical detectors are below the level of the fluid and are receiving light reflected from the target surface through the fluid; and
    wherein the control system is further configured to determine whether the level of the fluid within the container has dropped below the fluid threshold level based, at least in part, on comparing the measured reflectance of light received by the upper optical detector with a calibration reflectance value of the upper optical detector and comparing the measured reflectance of light received by the lower optical detector with a calibration reflectance value of the lower optical detector.

4. The apparatus of claim 3, wherein the control system is configured to determine that the level of the fluid in the container has dropped below the fluid threshold level if:
    the measured reflectance of light at the upper optical detector is greater than the calibration reflectance value of the upper optical detector;
    the measured reflectance of light at the lower optical detector is greater than the calibration reflectance value of the lower optical detector; and
    the measured reflectance of light at the lower optical detector is greater than the measured reflectance of light at the upper optical detector.

5. The apparatus of claim 3, wherein the control system is configured to determine that the level of the fluid in the container has dropped below the fluid threshold level if:
    the measured reflectance of light at the upper optical detector is greater than approximately 2.5 to 3.0 times the calibration reflectance value of the upper optical detector;
    the measured reflectance of light at the lower optical detector is greater than approximately 2.5 to 3.0 times the calibration reflectance value of the lower optical detector; and
    the measured reflectance of light at the lower optical detector is greater than approximately 0.3 times the measured reflectance of light at the upper optical detector.

6. The apparatus of claim 1, wherein the control system is further configured to determine whether the level of the fluid within the container has dropped below the fluid threshold level based, at least in part, on detecting that an intensity of light received by the upper optical detector indicates that the upper optical detector is above the level of the fluid, and that an intensity of light received by the lower optical detector indicates that at least a portion of the lower optical detector is above the level of the fluid.

7. The apparatus of claim 1, wherein the outside surface on which the one or more light emitters and the plurality of optical detectors are positioned is an outside surface on a same side of the container.

8. The apparatus of claim 1, wherein the one or more light emitters and the plurality of optical detectors do not contact the fluid in the container.

9. The apparatus of claim 1, wherein the one or more light emitters are configured to emit light through the container.

10. The apparatus of claim 1, wherein the one or more light emitters are configured to emit infrared light.

11. The apparatus of claim 1, wherein the control system is configured to generate an alarm based on a determination that the level of the fluid in the container has dropped below the fluid threshold level.

12. The apparatus of claim 1, wherein the alignment mark is further configured to be aligned with a line on the outside surface of the container denoting the fluid threshold level.

13. The apparatus of claim 1, wherein the control system is further configured to determine that the level of the fluid has transitioned from an upper region of the container to a lower region of the container when:
a decreasing value of illumination of light received at the upper optical detector is detected; and
a non-decreasing value of illumination of light received at the lower optical detector is detected.

14. The apparatus of claim 1, wherein the control system is further configured to determine that the level of the fluid has transitioned from an upper region of the container into a lower region of the container when:
a decreasing value of illumination of light received at the lower optical detector is detected; and
an increasing value of illumination of light received at the upper optical detector is detected.

15. The apparatus of claim 1, wherein the control system is further configured to determine that the level of the fluid has transitioned below a lower region of the container when:
an increasing value of illumination of light received at the lower optical detector is detected.

16. The apparatus of claim 1, wherein the control system is further configured to determine that the level of the fluid has transitioned below a lower region of the container when a non-decreasing value of illumination of light received at the upper optical detector is detected.

17. The apparatus of claim 1, wherein the control system is further configured to determine that the level of the fluid has transitioned to or below the fluid threshold level when:
an increasing value of illumination of light received at the lower optical detector is detected;
a non-decreasing value of illumination of light received at the upper optical detector is detected; and
a ratio of the value of illumination of light received at the upper optical detector and the value of illumination of light received at the lower optical detector exceeds a predetermined constant.

18. The apparatus of claim 17, wherein the predetermined constant is approximately 0.5.

19. The apparatus of claim 17, wherein the predetermined constant is approximately 0.3.

20. The apparatus of claim 1, further comprising a single light emitter and a linear array of optical detectors.

21. The apparatus of claim 1, further comprising a linear array of alternating light emitters and optical detectors.

22. The apparatus of claim 21, wherein the control system is further configured to:
analyze a sequence of measurements along the linear array using each of the alternating light emitters in conjunction with its two adjacent optical detectors; and
determine, based on the analyzed sequence of measurements, when the level of the fluid has reached a specific region of the container.

23. A method of optically monitoring a fluid level in a container comprising:
emitting, at periodic intervals, a light from one or more light emitters toward a target surface, the one or more light emitters configured to be positioned, at a fluid threshold level, on an outside surface of a container having at least some fluid within the container, wherein the fluid threshold level is a predefined fixed level;
measuring reflectance of light reflected from the target surface and received at each of a plurality of optical detectors, the plurality of optical detectors configured to be positioned on the outside surface of the container above and below the fluid threshold level, where an upper optical detector is positioned above the fluid threshold level and where a lower optical detector is positioned below the fluid threshold level;
detecting, based on the measured reflectance of light received by the upper optical detector, whether the upper optical detector is above a level of the fluid within the container;
detecting, based on the measured reflectance of light received by the lower optical detector, whether at least a portion of the lower optical detector is above the level of the fluid within the container; and
determining, based on whether the upper optical detector is above the level of the fluid within the container and whether at least a portion of the lower optical detector is above the level of the fluid within the container, whether the level of the fluid within the container has dropped below the fluid threshold level;
wherein positioning the one or more light emitters on the outside surface of the container at the fluid threshold level further comprises aligning the one or more light emitters using an alignment mark on a housing comprising the one or more light emitters and the plurality of optical detectors.

24. The method of claim 23, further comprising:
detecting that the lower optical detector is only partially above the level of the fluid; and
determining whether the level of the fluid in the container has dropped below the fluid threshold level based in part on detecting that the lower optical detector is only partially above the level of the fluid.

25. The method of claim 23, wherein the determining whether the level of the fluid within the container has dropped below the fluid threshold level further comprises:
storing calibration reflectance values that represent the reflectance of light received at the respective upper and lower optical detectors when the container is at a designated full level and both the upper and lower optical detectors are below the level of the fluid and are receiving the light reflected from the target surface through the fluid;
comparing the measured reflectance of light received by the upper optical detector with a calibration reflectance value of the upper optical detector; and
comparing the measured reflectance of light received by the lower optical detector with a calibration reflectance value of the lower optical detector.

26. The method of claim 25, further comprising determining that the level of the fluid in the container has dropped below the fluid threshold level by detecting if:
   the measured reflectance of light at the upper optical detector is greater than the calibration reflectance value of the upper optical detector;
   the measured reflectance of light at the lower optical detector is greater than the calibration reflectance value of the lower optical detector; and
   the measured reflectance of light at the lower optical detector is greater than the measured reflectance of light at the upper optical detector.

27. The method of claim 26, further comprising determining that the level of the fluid in the container has dropped below the fluid threshold level by detecting if:
   the measured reflectance of light at the upper optical detector is greater than approximately 2.5 times the calibration reflectance value of the upper optical detector;
   the measured reflectance of light at the lower optical detector is greater than approximately 2.5 times the calibration reflectance value of the lower optical detector; and
   the measured reflectance of light at the lower optical detector is greater than approximately 0.3 times the measured reflectance of light at the upper optical detector.

28. The method of claim 23, wherein detecting that the measured reflectance of light received by the upper optical detector indicates that the upper optical detector is above the level of the fluid, and that the measured reflectance of light received by the lower optical detector indicates that at least a portion of the lower optical detector is above the level of the fluid is based on an intensity of light received at the respective upper and lower optical detectors.

29. The method of claim 23, wherein emitting the light by the one or more light emitters comprises emitting the light through the container.

30. The method of claim 23, wherein emitting the light by the one or more light emitters comprises emitting infrared light.

31. The method of claim 23, further comprising generating an alarm based on a determination that the level of the fluid in the container has dropped below the fluid threshold level.

32. An apparatus for optically monitoring a fluid level in a container comprising:
   a housing comprising:
      a plurality of light emitters configured to emit a light toward a target surface when each of the plurality of light emitters is positioned on or near an outside surface of a container having at least some fluid within the container; and
      a plurality of optical detectors, each of the plurality of optical detectors positioned on or near the outside surface of the container and aligned with a corresponding one of the plurality of light emitters, and wherein each of the plurality of optical detectors is configured to receive the light emitted from the corresponding one of the plurality of light emitters and reflected from the fluid and the target surface;
      the housing having an alignment mark configured to aid in positioning the plurality of light emitters on the outside surface of the container at the fluid threshold level; and
   a control system configured to:
      receive information relating to a measured reflectance of light received by each of the plurality of optical detectors; and
      determine, based on the measured reflectance of light received by each of the plurality of optical detectors, whether a level of the fluid within the container has dropped below a predefined, fixed fluid threshold level.

33. The apparatus of claim 32:
   wherein the apparatus further comprises a memory configured to store calibration reflectance values that represent a reflectance of light received at respective upper and lower optical detectors when the container is at a designated full level and each of the plurality of optical detectors is below the level of the fluid and is receiving the light reflected from the target surface through the fluid; and
   wherein the control system is further configured to determine whether the level of the fluid within the container has dropped below the predefined, fixed fluid threshold level based, at least in part, on comparing the measured reflectance of light received by one or more of the plurality of optical detectors with the calibration reflectance values of the one or more of the plurality of optical detectors.

34. The apparatus of claim 33, wherein the control system is configured to determine that the level of the fluid within the container has dropped below the predefined, fixed fluid threshold level when it is determined that an optical detector of the plurality of optical detectors at or below the predefined, fixed fluid threshold level has a measured reflectance of light that is approximately three times a calibration reflectance value.

* * * * *